(12) United States Patent
Robinson

(10) Patent No.: US 7,249,666 B1
(45) Date of Patent: Jul. 31, 2007

(54) RETRACTABLE STOP ASSEMBLY

(76) Inventor: Brian O. Robinson, 302 N. Grove, Ypsilanti, MI (US) 48198

( * ) Notice: Subject to any disclaimer, the term of this patent is extended or adjusted under 35 U.S.C. 154(b) by 0 days.

(21) Appl. No.: 11/275,612

(22) Filed: Jan. 19, 2006

(51) Int. Cl.
*B65G 13/00* (2006.01)

(52) U.S. Cl. .................. 193/35 A; 198/345.3

(58) Field of Classification Search .......... 193/35 A, 193/32, 35 G, 40; 198/345.3, 343.1, 345.1, 198/463.4, 530
See application file for complete search history.

(56) References Cited

U.S. PATENT DOCUMENTS

| | | | |
|---|---|---|---|
| 4,136,763 A * | 1/1979 | Pryor et al. ............. | 193/35 A |
| 4,184,579 A | 1/1980 | Kantarian et al. | |
| 4,596,326 A * | 6/1986 | Yautz, Jr. .............. | 198/463.6 |
| 4,809,836 A * | 3/1989 | Zilber .................... | 193/35 A |
| 5,168,976 A | 12/1992 | Kettelson | |
| 5,211,276 A * | 5/1993 | Clopton ................. | 198/345.3 |
| 5,676,235 A * | 10/1997 | Sam et al. ............. | 198/345.3 |
| 5,911,297 A * | 6/1999 | Unterhuber ............ | 193/35 A |
| 6,119,843 A | 9/2000 | Robinson | |
| 6,290,051 B1 * | 9/2001 | Herrick, IV ............ | 198/345.3 |
| 6,763,930 B2 * | 7/2004 | Johnson et al. ......... | 198/459.6 |
| 7,111,721 B1 * | 9/2006 | Turner .................. | 198/345.3 |

* cited by examiner

*Primary Examiner*—Douglas Hess
(74) *Attorney, Agent, or Firm*—Brooks Kushman P.C.

(57) ABSTRACT

A power operated retractable stop assembly includes a body, a drive arm, and a stop arm. The drive arm is pivotable between a pre-locked position and an unlocked position. There is a locked position between the pre-locked position and the unlocked position. The stop arm is pivotally mounted to the body, has a front side for engaging a workpiece, and a back side for engaging the drive arm. When the drive arm is driven to the unlocked position, the drive arm and the stop arm interact to cause the stop arm to follow the drive arm and move to a stop arm released position. This precludes the stop arm from balancing at the stop arm locked position.

11 Claims, 4 Drawing Sheets

RETRACTABLE STOP ASSEMBLY

BACKGROUND OF THE INVENTION

1. Field of the Invention

The invention relates to power operated retractable stop assemblies.

2. Background Art

The use of industrial retractable stop products has become wide spread, due at least in part to high demands in the automotive and heavy equipment industries. Conventionally, a retractable stop is powered by a linear actuator such as an air or hydraulic cylinder, a solenoid actuator, or a rotary actuator with a linear worm gear.

A power operated retractable stop assembly typically includes a reciprocatable rod member driven by the linear actuator, and an assembly body secured to the driving cylinder. Some of these existing assemblies, such as those described in U.S. Pat. No. 4,184,579, utilize a stop lever for stopping and releasing loads traveling on a conveyor. In such an assembly, a blocker leg is used to prevent pivoting of the stop arm causing an uncushioned hard stop of loads traveling on the conveyor when the blocker leg is in the blocking position.

Other existing assemblies attempt to provide a cushioned stop by using cylinder pressure to hold the stop arm in the blocking position. However, assemblies such as these may be disadvantageous in that there is no guarantee of a stop, and a heavy load may deflect the stop lever against the biasing cylinder pressure and continue right past the retractable stop without stopping. Sometimes, assemblies utilize a first mechanism for actuating and deactuating the stop and utilize a separate shock absorber mechanism, such as the assembly described in U.S. Pat. No. 5,168,976.

Other existing assemblies use a linear actuator rod interfering at a right angle with the direction of travel of the conveyor load. This has the disadvantage of side loading the actuator which is designed for the loads to be in line with the center line of the actuator. This creates excessive wear of the actuator. Also, excessive side load on a linear actuator can cause the actuator to bind and be unable to release without first releasing the load.

Although the existing retractable stop assemblies that provide a hard stop and those assemblies that attempt to provide a cushioned stop by using cylinder pressure have been used in many applications that have been commercially successful, these assemblies have disadvantages. In some applications, it may be desirable to provide a cushioned stop, and assemblies providing a hard stop without any cushion may not be desired. Further, although a cushion may be desirable in some applications, because assemblies providing a cushioned stop cannot guarantee a stopping of the load after the cushion, these assemblies may also not be desired. Further, assemblies utilizing a separate shock absorber mechanism are complex and costly, so these assemblies may also not be desired.

Power operated retractable stop assemblies with integral cushion and stopping mechanisms are described in U.S. Pat. No. 6,119,843. These power operated retractable stop assemblies provide a cushion when stopping a load and provide a hard stop at the end of the cushion zone. These existing retractable stop assemblies that provide integral cushion and stopping mechanisms have also been used in applications that have been commercially successful.

There is an opportunity for improvement in integral cushion and stopping mechanisms in the situation where the stop arm remains near the locked position after the drive arm, which drives the stop arm, is driven to the unlocked position. That is, the stop arm balances near the locked position even though it has been released by the drive arm. If this situation occurs in a conveyor arrangement where there is cross-traffic, and the stop assembly is located at a cross-traffic point, the balanced stop arm may interfere with the cross-traffic.

The balanced stop arm condition also makes it difficult for a worker to determine the position of the drive arm and the driving cylinder by visual inspection. When the worker sees the stop arm at the locked position, the worker may assume that the cylinder has been actuated to cause the drive arm to engage and drive the stop arm. However, this assumption is not correct in the case where the stop arm balances near the locked position after it has been released by the drive arm.

Another opportunity for improvement in integral cushion and stopping mechanisms occurs when the retractable stop assembly is mounted in an inverted orientation. Because the assembly is in an inverted orientation, the stop arm may again balance near the locked position after the drive arm is driven to the unlocked position. Even if the stop arm has been pushed to the open position by a passing load, gravity will cause it to return to the locked position. That is, the stop arm hangs near the locked position even though it has been released.

Although the existing power operated retractable stop assemblies with integral cushion and stopping mechanisms have advantages, there are still situations where these assemblies may have shortcomings. In particular, the potential for a balanced stop arm condition may make it undesirable to use these assemblies in certain conveyor applications and in certain applications requiring the assemblies to be mounted in inverted orientations.

For the foregoing reasons, there is a need for an improved power operated retractable stop assembly.

SUMMARY OF THE INVENTION

It is an object of the invention to provide a power operated retractable stop assembly in which the stop arm and drive arm interact to cause the stop arm to automatically follow the drive arm and move to a released position, and avoid hanging or balancing near the locked position, when the drive arm is driven to the released or unlocked position.

The invention involves a power operated retractable stop assembly. The assembly comprises a body, a reciprocatable member, a drive arm, and a stop arm. The reciprocatable member extends at least partially into the body and is adapted to engage a driving means such as a cylinder. The reciprocatable member is driveable between an extended position and a retracted position. The drive arm is pivotally mounted to the body and drivingly connected to the reciprocatable member such that the drive arm is pivoted about a drive axis. The drive arm is pivotable over a motion range between a pre-locked position and an unlocked position in response to movement of the reciprocatable member. The motion range includes a locked position between the pre-locked position and the unlocked position. The drive arm has a central axis passing through the drive axis to define a drive arm plane that pivots with the drive arm.

The stop arm is pivotally mounted to the body such that the stop arm is pivotable about a stop axis. The stop arm has a front side for engaging a workpiece and a back side for engaging the drive arm. The stop arm is positioned to apply a reaction force to the drive arm in response to a force exerted on the stop arm front side by a workpiece.

The stop arm back side is configured such that the reaction force has a component normal to the drive arm plane when the drive arm is between the pre-locked position and the locked position. The normal component of the reaction force urges the drive arm toward the locked position. Further, the stop arm back side is configured such that the reaction force is substantially coplanar with the drive arm plane when the drive arm is in the locked position to cause the drive arm to remain at the locked position.

In accordance with the invention, when the drive arm is driven to the unlocked or released position, the stop arm and drive arm interact to cause the stop arm to automatically follow the drive arm to move to and stay in a released position. This interaction precludes the stop arm from balancing at the ready or locked position.

It is appreciated that the interaction of the stop arm and drive arm may be achieved in various ways. In the preferred embodiment of the invention, the drive arm has an added leg below the drive arm pivot, and the stop arm has an added leg below the stop arm pivot. When the drive arm is driven to the drive arm unlocked or released position, the lower leg of the stop arm rides on the lower leg of the drive arm to cause the stop arm to automatically follow the drive arm and move to and be held in the stop arm released position, precluding the stop arm from balancing at the ready or locked position.

In another aspect, the invention comprehends an apparatus comprising a body, a drive arm, and a stop arm. The drive arm is pivotally mounted to the body such that the drive arm is pivotable about a drive axis. The drive arm is pivotable over a motion range between a pre-locked position and an unlocked position. The motion range includes a locked position between the pre-locked position and the unlocked position. The stop arm is pivotally mounted to the body such that the stop arm is pivotable about a stop axis. The stop arm has a front side for engaging a workpiece and a back side for engaging the drive arm. When the drive arm is driven to the unlocked or released position, the stop arm and drive arm interact to cause the stop arm to automatically follow the drive arm to move to a released position. This interaction precludes the stop arm from balancing at the ready or locked position and may be achieved, for example, by a lower leg of the stop arm riding on a lower leg of the drive arm when the drive arm is driven to the drive arm unlocked or released position.

DETAILED DESCRIPTION OF THE PREFERRED EMBODIMENT

Figure 1:
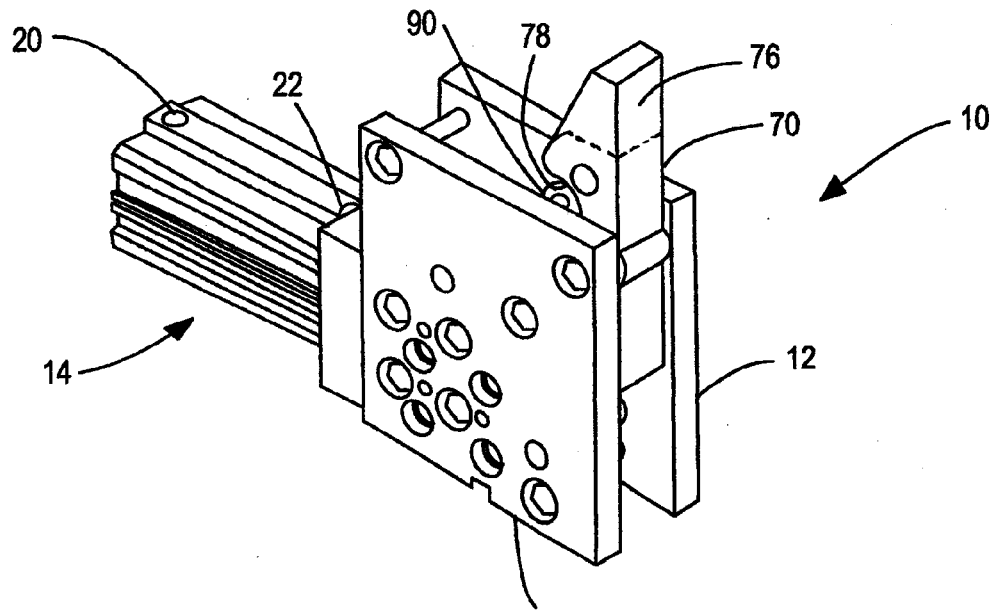
FIG. 1 is a perspective view of a power operated retractable stop assembly in a preferred embodiment of the invention.
Figure 2:
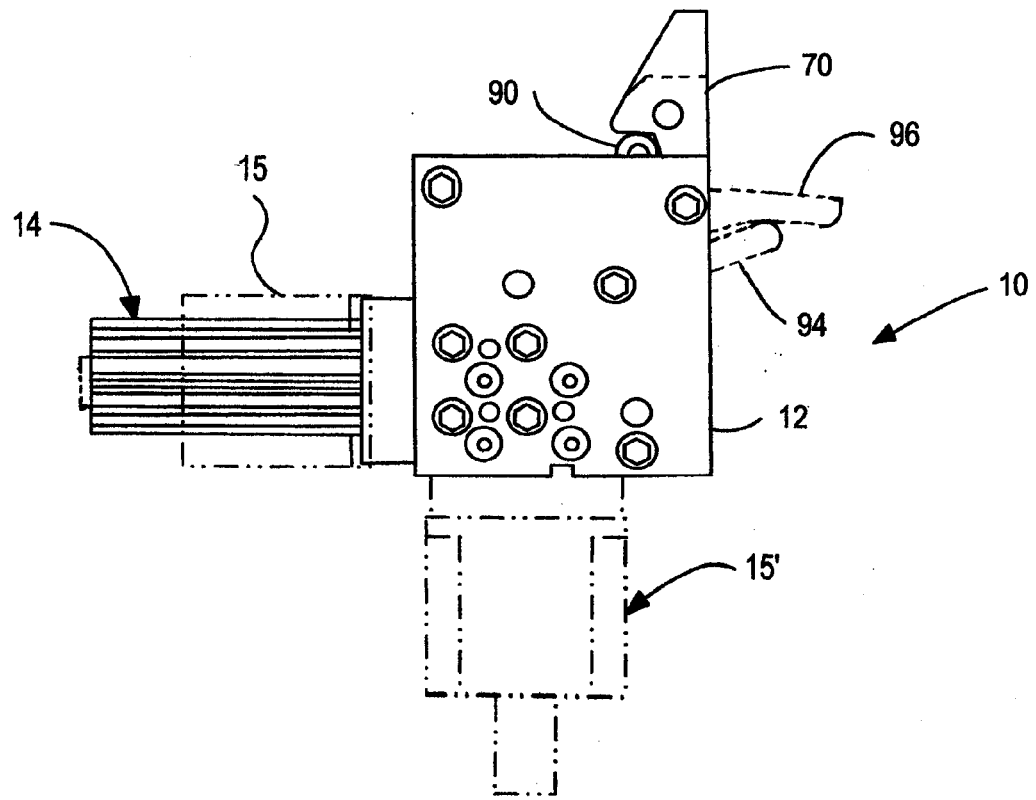
FIG. 2 is a side view of the stop assembly, and illustrates the ability to interchangeably mount a linear actuator to the front or bottom of the stop.
Figure 3:
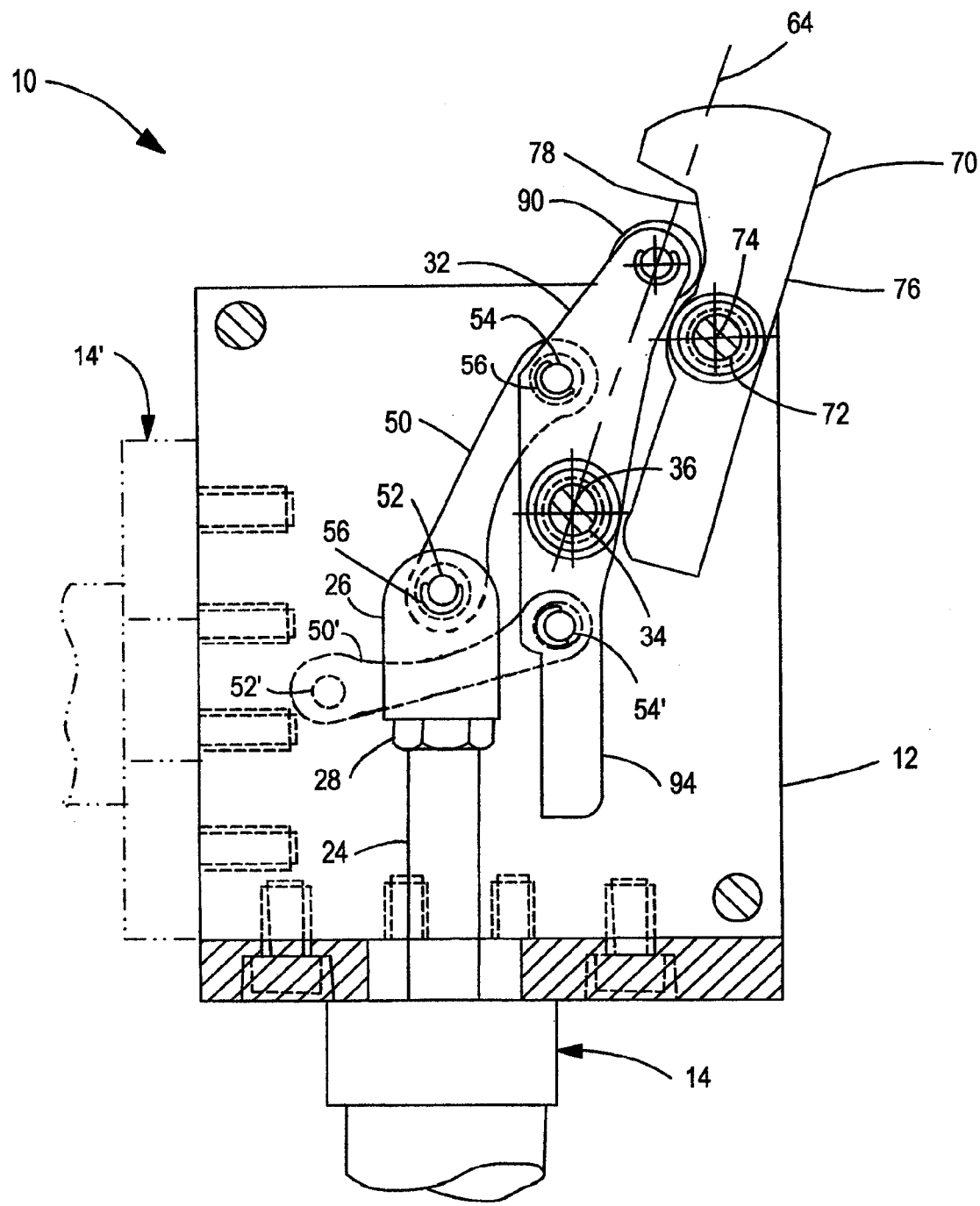
FIG. 3 is a side view, in section, of the stop assembly.
Figure 4:
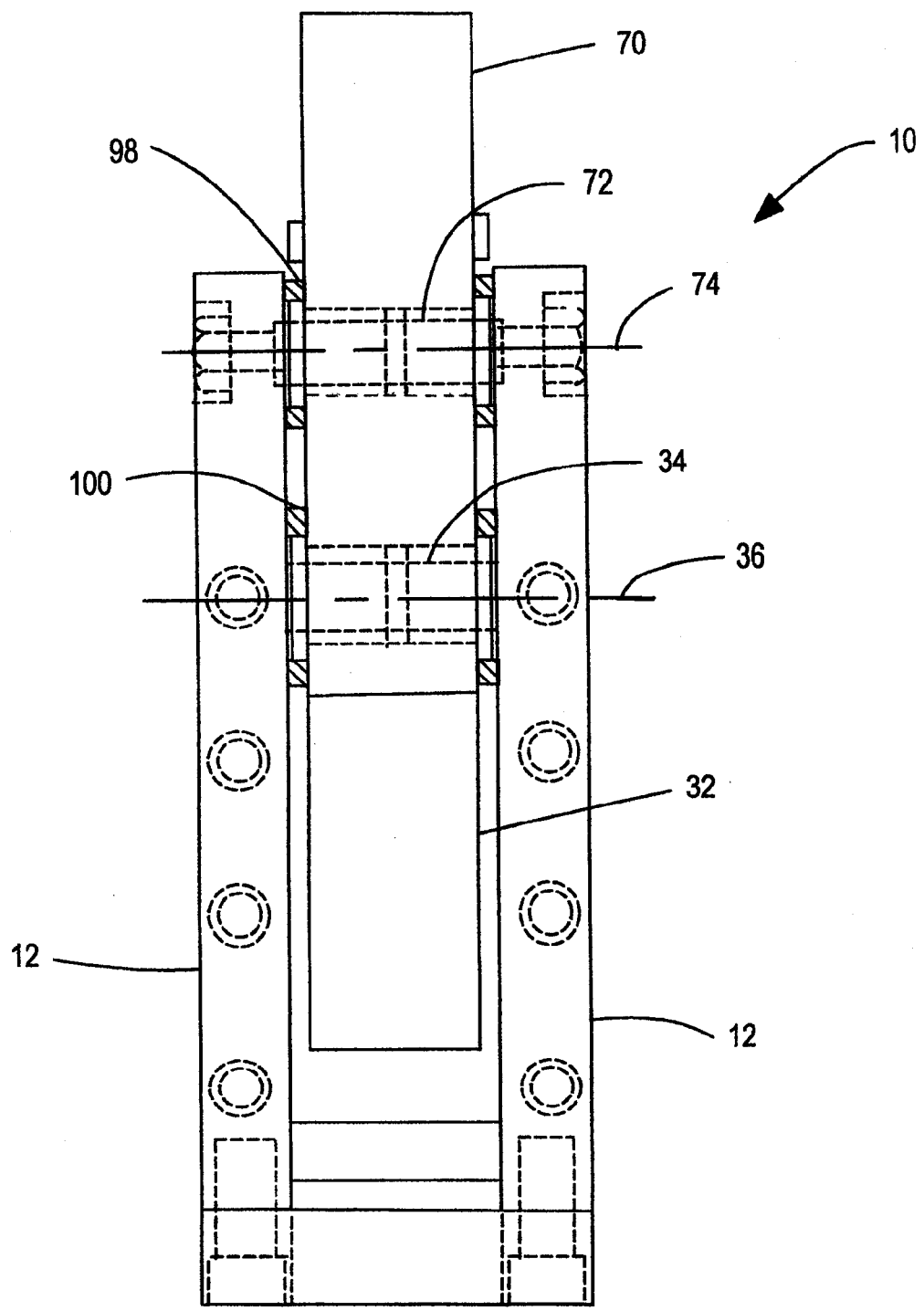
FIG. 4 is an end view of the stop assembly.
Figure 5:
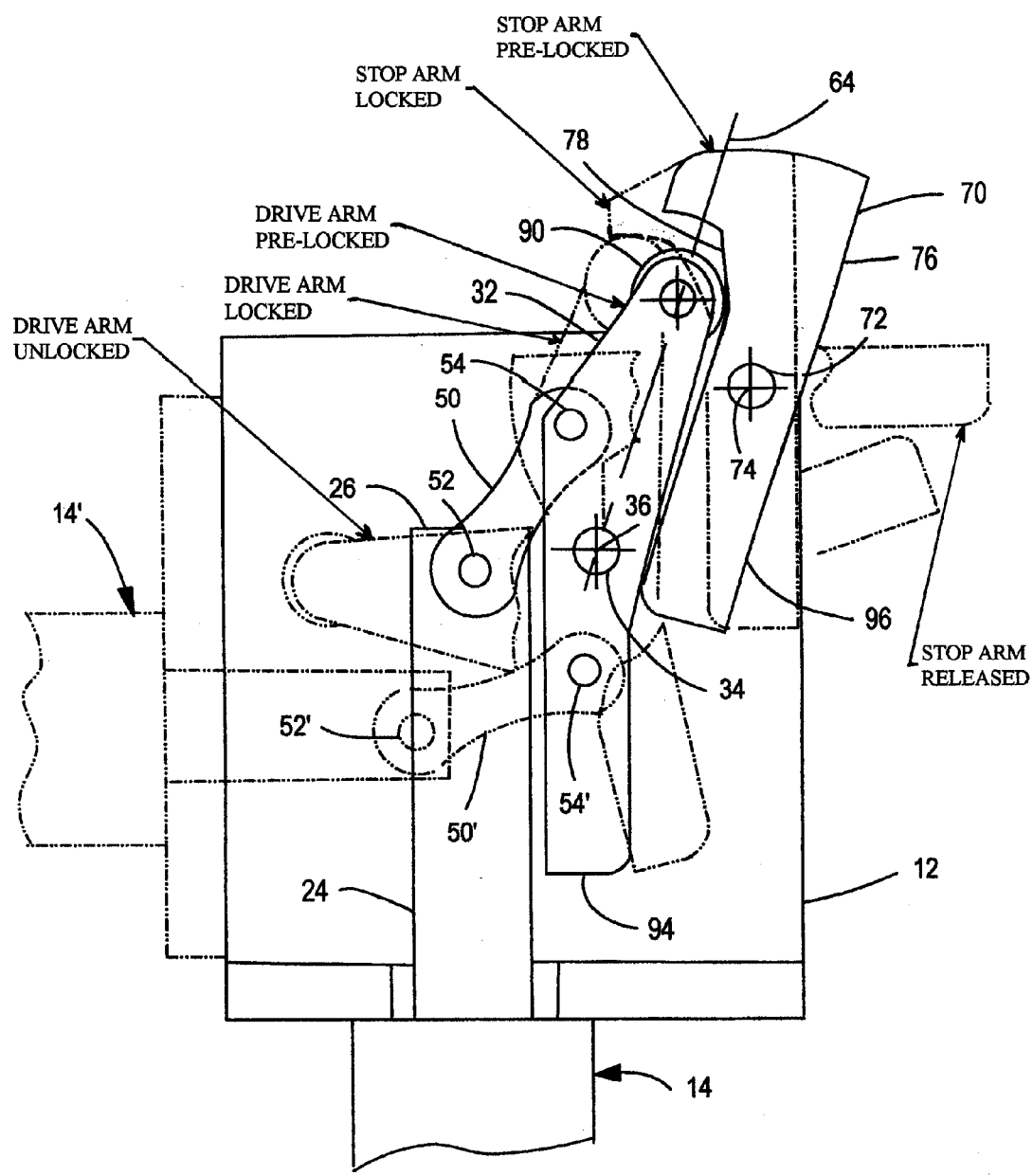
FIG. 5 is a schematic diagram that illustrates the pre-locked, locked, and unlocked positions for the stop assembly.

Referring to FIGS. 1–5 which illustrate a power operated retractable stop assembly in the preferred embodiment of the invention, and primarily to FIGS. 3 and 5, the stop assembly is generally indicated at 10. Stop assembly 10 has a body composed of sides 12. A driving means engages the assembly body. A suitable driving means is a piston and cylinder assembly, generally indicated at 14. Piston and cylinder assembly 14 includes a cylinder in which a piston is driven, and has suitable ports 20 and 22 for connecting to a fluid source. Piston and cylinder assembly 14 forms a linear actuator and may be either powered by air (or other gas) or hydraulic media. An air powered cylinder is suitable for providing a cushioning zone due to the compressability of gas. Alternatively, a hydraulic cylinder with a pressure relief valve may be employed to provide the cushioning zone.

A reciprocatable member such as push rod 24 is driven by piston and cylinder assembly 14 and extends into stop body sides 12. Reciprocatable member 24 is driveable by piston and cylinder assembly 14 over a stroke range between an extended position and a retracted position. Reciprocatable member 24 includes an end 26 that is adjustably secured by a nut 28. This arrangement allows some adjustment of the extended and retracted positions for reciprocatable member 24 and is shown in FIG. 3.

A drive arm 32 is pivotally mounted to body 12. A pin and bearing arrangement 34 mounts drive arm 32 to body 12, and prevents rotational and side thrust friction and wear. Drive arm 32 is pivotable about drive axis 36. Drive arm 32 is connected to reciprocating member end 26 by intermediate link 50. Link 50 pivotally connects to end 26 by pin 52, and to drive arm 32 by pin 54. Pins 52 and 54 are held in place by retaining clips 56. The pin arrangements move with respect to body 12 during operation and only extend within the body sides.

As best shown in FIG. 5, drive arm 32 is pivotable about drive axis 36 over a motion range between a pre-locked position and an unlocked position (shown in phantom). Further, the motion range includes a locked position (also shown in phantom) between the pre-locked and unlocked positions.

Reciprocatable member 24 is extended when drive arm 32 is in the pre-locked position, and retracted when drive arm 32 is in the unlocked position. Reciprocatable member 24 moves to an intermediate position when drive arm 32 is in the locked position.

As shown in FIGS. 3 and 5, link 50 is reversible to allow the piston and cylinder assembly to be mounted to the side of stop assembly 10 as opposed to the bottom of stop assembly 10. As shown in phantom, piston and cylinder assembly 14' is mounted to the side of stop assembly 10 and link 50' pivotally connects to the reciprocating member with pin 52' and to drive arm 32 with pin 54'. In this alternate arrangement, drive arm 32 will move to the pre-locked position when the reciprocating member is retracted, and will move to the unlocked position when the reciprocating member is extended. In either orientation for the driving means, it is appreciated that an alternate driving means such as a motor 15 or 15' (shown in phantom in FIG. 2) may be used.

With continuing reference to FIG. 5, drive arm 32 moves over its motion range in response to movement of reciprocatable member 24. Drive arm 32 has a central axis 64 passing through drive axis 36 to define a drive arm plane that pivots with the drive arm. The drive arm plane rotates as drive arm 32 rotates.

Stop assembly 10 also includes a stop arm 70. Stop arm 70 is affixed to body 12 by pin and bearing assembly 72, which extends through body 12 and prevents rotational and side thrust friction and wear. Stop arm 70 is pivotable about a stop axis 74. Stop arm 70 has a front side 76 for engaging a workpiece and a back side 78 for engaging drive arm 32.

Stop arm 70 is arranged to apply a reaction force to drive arm 32 in response to a force exerted on front side 76.

As best shown in FIG. 5, stop arm back side 78 is configured such that a reaction force applied by stop arm back side 78 to drive arm 32 in response to the force of a workpiece on stop arm 70 has a component that is normal to the drive arm plane 64 when the drive arm 32 is between the pre-locked position and the locked position. Because drive axis 36 lies in the drive arm plane, forces normal to the drive arm plane urge the drive arm 32 toward the locked position through a cushioning zone provided by the driving means 14. As such, configuring stop arm back side 78 such that the reaction force has a component normal to the drive arm plane when drive arm 32 is between the pre-locked position and the locked position causes drive arm 32 to be urged to the locked position whenever a workpiece contacts stop arm 70 and the drive arm is between the pre-locked position and the locked position.

Further, when drive arm 32 reaches its locked position, the configuration of stop arm back side 78 causes the reaction force applied by stop arm back side 78 to drive arm 32 to be substantially coplanar with the drive arm plane. Because drive arm axis 36 lies in the drive arm plane, substantially coplanar reaction forces are opposed by pin and bearing assembly 34, and do not cause drive arm 32 to rotate out of the locked position.

Advantageously, pin and bearing assembly 34 holds the stop assembly 10 in the locked position against the force of any load or workpiece. After drive arm 32 and stop arm 70 have remained in the locked positions for a desired amount of time, piston and cylinder assembly 14 may be actuated to urge drive arm 32 to the unlocked position causing stop arm 70 to pivot and allow the workpiece to pass.

The illustrated embodiment provides a cushioning zone between the pre-locked and locked positions in which the amount of cushion may be determined by selecting appropriate lever arm lengths, pivot point positions, and actuator operating pressures or pressure relief valve configurations. After the cushioning zone, a hard stop is provided. Advantageously, the hard stop directs all force from the workpiece in a direction coplanar with the drive arm plane such that this reaction force is received by pin and bearing assembly 34 almost in its entirety.

Cam roller 90, located at the end of drive arm 32, is positioned to engage stop arm back side 78. The freely rotating roller eliminates friction that could prevent release of the interlocked arms while under load from conveyor travel. This roller 90 also reduces friction between the arms when moving from release positions to ready or pre-locked positions and from ready or pre-locked positions to locked positions during shock absorbing action.

With continuing reference to FIGS. 1–5, and as best shown in FIG. 5, drive arm 32 at one end engages stop arm back side 78 and at the other end has a leg 94. Stop arm 70 has a leg 96. Drive arm lower leg 94 is below the drive arm pivot and stop arm leg 96 is below the stop arm pivot. When drive arm 32 is driven to the drive arm unlocked or released position, lower leg 96 of stop arm 70 rides on lower leg 94 of drive arm 32 to cause stop arm 70 to automatically follow drive arm 32 and move to the stop arm released position. This precludes stop arm 70 from balancing at the ready or locked position which would be problematic in certain situations. It is appreciated that this interaction of stop arm 70 and drive arm 32 may be achieved in various ways, and is achieved through the interaction of stop arm lower leg 96 and drive arm lower leg 94 in the preferred embodiment.

It is appreciated that embodiments of the invention have many advantages. For example, the interaction of the stop arm and drive arm precludes the stop arm from balancing near the locked position after it has been released by the drive arm. In a conveyor arrangement where there is cross-traffic, and the stop assembly is located at a cross-traffic point, the interaction of the stop arm and drive arm assures that the stop arm moves to its released position so as not to interfere with the cross-traffic. Another advantage of the interaction of the stop arm and drive arm is that a worker may determine the position of the drive arm and the driving cylinder (or other drive mechanism) by visual inspection because the stop arm cannot balance near the locked position when the drive arm is driven to the unlocked or released position. Still further, embodiments of the invention may be useful in applications where the stop assembly is mounted in an inverted orientation. The interaction of the stop arm and drive arm precludes the stop arm from hanging near the locked position after release.

It is to be appreciated that preferred embodiments of the invention provide the ability to interchangeably mount the driving means through the front or bottom of the stop assembly to accommodate varied application conditions. Threaded mounting holes for mounting the drive means, for example, a piston and cylinder assembly or motor, double as mounting holes to mount the stop to conveyor framework. In this way, one set of mounting holes is used to mount the driving means while the other set of mounting holes is used to mount the stop assembly to the conveyor framework.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A power operated retractable stop assembly comprising:
   a body;
   a reciprocatable member extending into the body and adapted to engage a driving means, the reciprocatable member being driveable between an extended position and a retracted position;
   a drive arm pivotally mounted to the body and drivingly connected to the reciprocatable member such that the drive arm is pivotable about a drive axis over a motion range between a pre-locked position and an unlocked position in response to movement of the reciprocatable member, the motion range including a locked position between the pre-locked position and the unlocked position, and the drive arm having a central axis passing through the drive axis to define a drive arm plane that pivots with the drive arm; and
   a stop arm pivotally mounted to the body such that the stop arm is pivotable about a stop axis, the stop arm having a front side for engaging a workpiece and a back side for engaging the drive arm, the stop arm being positioned to apply a reaction force to the drive arm in response to receiving a force exerted on the stop arm front side by a workpiece,
   wherein the stop arm back side is configured such that the reaction force has a component normal to the drive arm plane when the drive arm is between the pre-locked position and the locked position to urge the drive arm toward the locked position, and such that the reaction force is substantially coplanar with the drive arm plane when the drive arm is in the locked position to cause the drive arm to remain at the locked position with the stop arm held at a stop arm locked position, wherein when the drive arm is driven to the unlocked position, the drive arm and the stop arm interact to cause the stop arm to follow the drive arm and move to a stop arm released position, precluding the stop arm from balancing at the stop arm locked position.

2. The stop assembly of claim 1 wherein the drive arm has an end, and the stop assembly further comprises:

a cam roller located at the drive arm end and positioned to engage the stop arm back side, the roller having an axis of rotation that is substantially parallel to the drive axis and is substantially coplanar with the drive arm plane.

3. The stop assembly of claim 1 wherein:

the drive arm has a first end that engages the stop arm back side and a second end, the drive arm having a leg extending toward the drive arm second end;

wherein the stop arm has a first end that engages the workpiece and a second end, the stop arm having a leg extending toward the stop arm second end; and wherein when the drive arm is driven to the unlocked position, the stop arm leg rides on the drive arm leg to cause the stop arm to follow the drive arm and move to the stop arm released position.

4. The stop assembly of claim 1 wherein the drive arm and the reciprocating member are configured such that the drive arm pre-locked position corresponds to the reciprocatable member retracted position, and the drive arm unlocked position corresponds to the reciprocatable member extended position.

5. The stop assembly of claim 1 wherein the drive arm and the reciprocating member are configured such that the drive arm pre-locked position corresponds to the reciprocatable member extended position, and the drive arm unlocked position corresponds to the reciprocatable member retracted position.

6. The stop assembly of claim 1 further comprising:

a link connecting the reciprocatable member to the drive arm.

7. The stop assembly of claim 6 wherein the link is reversible to allow the link to connect on either side of the drive arm pivot to accommodate variable driving means mounting capability.

8. The stop assembly of claim 1 further comprising:

a piston/cylinder assembly engaging the reciprocatable member for driving the reciprocatable member.

9. The stop assembly of claim 1 further comprising:

a motor assembly engaging the reciprocatable member for driving the reciprocatable member.

10. In a power operated retractable stop assembly including a body, a drive arm, and a stop arm, wherein the drive arm is pivotally mounted to the body and pivotable about a drive axis over a motion range between a pre-locked position and an unlocked position, the motion range including a locked position between the pre-locked position and the unlocked position, and wherein the stop arm is pivotally mounted to the body and pivotable about a stop axis, the stop arm having a front side for engaging a workpiece and a back side for engaging the drive arm, the improvement comprising:

the drive arm has a first end that engages the stop arm back side and a second end, the drive arm having a leg extending toward the drive arm second end;

wherein the stop arm has a first end that engages the workpiece and a second end, the stop arm having a leg extending toward the stop arm second end; and wherein when the drive arm is driven to the unlocked position, the stop arm leg rides on the drive arm leg to cause the stop arm to follow the drive arm and move to a stop arm released position, precluding the stop arm from balancing at a stop arm locked position.

11. A method of operating a power operated retractable stop assembly comprising:

providing a body;

providing a reciprocatable member extending into the body and adapted to engage a driving means, the reciprocatable member being driveable between an extended position and a retracted position;

providing a drive arm pivotally mounted to the body and drivingly connected to the reciprocatable member such that the drive arm is pivotable about a drive axis over a motion range between a pre-locked position and an unlocked position in response to movement of the reciprocatable member, the motion range including a locked position between the pre-locked position and the unlocked position, and the drive arm having a central axis passing through the drive axis to define a drive arm plane that pivots with the drive arm; and providing a stop arm pivotally mounted to the body such that the stop arm is pivotable about a stop axis, the stop arm having a front side for engaging a workpiece and a back side for engaging the drive arm, the stop arm being positioned to apply a reaction force to the drive arm in response to receiving a force exerted on the stop arm front side by a workpiece, wherein the stop arm back side is configured such that the reaction force has a component normal to the drive arm plane when the drive arm is between the pre-locked position and the locked position to urge the drive arm toward the locked position, and such that the reaction force is substantially coplanar with the drive arm plane when the drive arm is in the locked position to cause the drive arm to remain at the locked position with the stop arm held at a stop arm locked position, wherein when the drive arm is driven to the unlocked position, the drive arm and the stop arm interact to cause the stop arm to follow the drive arm and move to a stop arm released position, precluding the stop arm from balancing at the stop arm locked position.

* * * * *